US011208961B2

(12) United States Patent
Weber et al.

(10) Patent No.: US 11,208,961 B2
(45) Date of Patent: Dec. 28, 2021

(54) METHOD AND CONTROL DEVICE FOR OPERATING AN INTERNAL COMBUSTION ENGINE

(71) Applicant: MAN Energy Solutions SE, Augsburg (DE)

(72) Inventors: Armin Weber, Kammlach (DE); Martin Karg, Hattenhofen (DE)

(73) Assignee: MAN Energy Solutions SE, Augsburg (DE)

( * ) Notice: Subject to any disclaimer, the term of this patent is extended or adjusted under 35 U.S.C. 154(b) by 0 days.

(21) Appl. No.: 16/740,841

(22) Filed: Jan. 13, 2020

(65) Prior Publication Data

US 2020/0224596 A1 Jul. 16, 2020

(30) Foreign Application Priority Data

Jan. 16, 2019 (DE) ...................... 10 2019 101 020.9

(51) Int. Cl.
*F02D 41/20* (2006.01)
*F02D 19/02* (2006.01)
*F02D 41/40* (2006.01)

(52) U.S. Cl.
CPC ......... *F02D 19/026* (2013.01); *F02D 19/024* (2013.01); *F02D 41/40* (2013.01); *F02D 2041/2055* (2013.01); *F02D 2041/2058* (2013.01)

(58) Field of Classification Search
CPC ..... F02D 2041/2055; F02D 2041/2058; F02D 19/026; F02D 19/024; F02D 41/40
See application file for complete search history.

(56) References Cited

U.S. PATENT DOCUMENTS

| 10,330,064 B2* | 6/2019 | Sakamoto | F02M 59/368 |
| 2016/0186741 A1* | 6/2016 | Sakamoto | F02M 63/0043 417/290 |
| 2018/0142655 A1* | 5/2018 | Thomas | F02M 51/005 |
| 2018/0156153 A1* | 6/2018 | Denk | F02D 41/2467 |

* cited by examiner

*Primary Examiner* — Gonzalo Laguarda
(74) *Attorney, Agent, or Firm* — Cozen O'Connor

(57) ABSTRACT

A method for operating an internal combustion engine having at least one fuel injector that is activated for opening and closing via a solenoid valve of a respective fuel injector. Commencing with the activation of the fuel injector for opening, structure-borne sound waves emitted by the fuel injector over the time are detected by measurement. A structure-borne sound wave signal detected by measurement over the time is evaluated such that dependent on the amount of at least one maximum of the structure-borne sound wave signal and/or dependent on the number of the maximums of the structure-borne sound wave signal and/or in the presence of multiple maximums dependent on the time sequence and/or on the amount of the maximums, an operating state of the respective fuel injector is deduced.

10 Claims, 2 Drawing Sheets

METHOD AND CONTROL DEVICE FOR OPERATING AN INTERNAL COMBUSTION ENGINE

BACKGROUND OF INVENTION

1, Field of the Invention

The invention relates to a method for operating an internal combustion engine and a control device for carrying out the method.

2. Description of Related Art

An internal combustion engine comprises multiple cylinders. In the region of each cylinder at least one fuel injector is installed. The fuel injectors are activatable for opening and closing namely by way of solenoid valves of the fuel injectors, which are supplied with a corresponding activation current. The fuel injectors can be fuel injectors for diesel fuels such as heavy fuel oil or residual oil or fuel injectors for gas fuels. Fuel injectors are also referred to as fuel injection valves.

Dual fuel engines known from the prior art have three fuel injectors for each cylinder, namely a main fuel injector for diesel fuels, via which in a first operating mode, which is also referred to as diesel operating mode, combustible diesel fuel is introduced into the cylinders, and a gas fuel injector and an ignition fluid fuel injector, wherein in a second operating mode, which is also referred to as gas operating mode, a mixture of charge air and gas fuel which is typically incombustible is provided via the gas fuel injector, which can be ignited by way of ignition fluid, which is introduced in the second operating mode into the respective cylinders via the ignition fluid fuel injector. There, the diesel fuel serves as ignition fluid. Since in the second operating mode relatively small quantities of diesel fuel have to be introduced into the respective cylinder and main fuel injectors are not typically designed for providing such small fuel quantities, it is typically required according to the prior art, to install separate ignition fluid fuel injectors on a dual fuel engine.

Since the provision of a separate ignition fluid injector requires additional components and additional installation space, endeavors are known from practice to utilise the main fuel injector in the second operating mode for introducing small quantities of the ignition fluid. There it is then of decisive importance to monitor the exact small injection quantities into the cylinder in the second operating mode. Only in particular when in the second operating mode the ignition fluid can be highly-accurately introduced into the respective cylinder is it possible to adhere to emission standards.

Thus, when a main fuel injector is utilised in order to introduce, on the one hand, relatively much diesel fuel in the first operating mode and, on the other hand, introduce relatively little diesel fuel as ignition fluid into a cylinder in the second operating mode, the monitoring and determining of the relevant operating mode or of the relevant operating state of the respective fuel injector is important.

Similar tasks exist also with pure diesel internal combustion engines, in which exclusively diesel fuel is combusted. Accordingly it is already known from practice to introduce, in addition to a main injection, in which relatively much diesel fuel is introduced into the cylinders of a diesel internal combustion engine, to introduce a relatively small fuel quantity into the respective cylinder via a pre-injection and/or post-injection. In this case, the main fuel injector also serves for introducing a relatively large fuel quantity during the main injection and introducing a relatively small fuel quantity during a pre-injection and/or post-injection. In this connection it is then also important to determine the operating state in which the respective fuel injector is operated in order to thus ensure that the same injects the fuel with the required accuracy into the respective cylinder.

SUMMARY OF THE INVENTION

One aspect of the present invention is based on creating a new f method for operating an internal combustion engine and a control device for carrying out the method.

According to one aspect of the invention, structure-borne sound waves emitted by a respective fuel injector are determined by measurement commencing with the activation of the respective fuel injector for opening over time. A structure-borne sound wave signal detected by measurement over the time is evaluated such that dependent on the amount of at least one maximum of the structure-borne sound wave signal and/or dependent on the number of the maximums of the structure-borne sound wave signal and/or in the presence of multiple maximums dependent on the time sequence and/or amount of the maximums, an operating mode of the respective fuel injector is deduced.

According to one aspect of the invention it is proposed, upon commencement of the activation of a respective fuel injector, i.e. upon commencement of the energization of the solenoid valve of the same with an activation current, to detect structure-borne sound waves emitted by the respective fuel injector. A structure-born sound wave signal thus detected by measurement is evaluated in a defined manner in order to deduce the operating mode of the respective fuel injector. For this purpose, local maximums in the structure-borne sound wave signal are detected. Dependent on the amount of at least one detected local maximum of the structure-borne sound wave signal and/or dependent on the number of the local maximums of the structure-borne sound wave signal and/or in the presence of multiple local maximums dependent on the time sequence and/or amount of the local maximums, the operating mode of the respective fuel injector is deduced. By way of this it can be determined in a simple and reliable manner if the fuel injector injects relatively small fuel quantities or relatively large fuel quantities or a medium quantity of fuel into the cylinder of the internal combustion engine.

In particular when, within a defined first period after the commencement of the activation of the respective fuel injector for opening a first maximum occurs in the structure-borne sound wave signal detected by measurement, whose amount is greater than a first limit value, preferentially a first operating state of the respective fuel injector is deduced. The first operating state of the respective fuel injector is an operating state of a small quantity injection of fuel into the respective cylinder. In particular when this operating condition is present, the first operating state of the respective fuel injector can be deduced, i.e. that the fuel injection injects small quantities of fuel into the respective cylinder.

In particular when in the structure-borne sound wave signal within the defined first period a first maximum occurs whose amount is smaller than the first limit value but greater than a second limit value, and in particular when subsequently no further maximum occurs whose amount is greater than the second limit value, preferentially a second operating state is deduced. In particular when in the structure-borne sound wave signal within the defined first period a first maximum occurs whose amount is smaller than the first limit value but greater than the second limit value, and when subsequently within the defined first period or within a defined second period following the occurrence of the first maximum a second maximum occurs whose amount is in particular greater than the second limit value, the second operating state is deduced. In particular when in the structure-borne sound wave signal within the first period a first maximum occurs whose amount is smaller than the first limit value but greater than the second limit value, and when subsequently a second maximum occurs whose amount is in particular greater than the first limit value, but this second maximum does not occur within the defined first period or not within the defined second period but within a longer, defined period following the occurrence of the first maximum, the third operating state is deduced. Thus, the second or third operating state can be deduced in a simple and reliable manner.

Preferentially, the third operating state of the respective fuel injector is an operating state of a large quantity injection of fuel into the respective cylinder and the second of the respective fuel injector an operating state of a medium quantity injection of fuel into the respective cylinder.

BRIEF DESCRIPTION OF THE DRAWINGS

Preferred further developments of the invention are obtained from the subclaims and the following description. Exemplary embodiments of the invention are explained in more detail by way of the drawing without being restricted to this. There it shows:

DETAILED DESCRIPTION OF THE PRESENTLY PREFERRED EMBODIMENTS

The invention relates to a method for operating an internal combustion engine and to a control device for carrying out the method.

An internal combustion engine comprises multiple cylinders. In each cylinder of the internal combustion engine fuel is combusted. The fuel is introduced into the respective cylinder by way of a fuel injector. The respective fuel injector comprises a solenoid valve, which is activated with an activation current for opening and closing the fuel injector. Depending on how long the solenoid valve is activated with the activation current, either a relatively low fuel quantity or a relatively high fuel quantity is injected into the cylinder.

However, the length of the activation current is not suitable for deducing if fuel is injected and how much fuel is actually injected into the respective cylinder via the respective fuel injector. The reason for this can be for example that a nozzle needle of the respective fuel injector is jammed There is thus a need for determining the operating state in which a fuel injector is actually operated in particular when the fuel injector can or is to be utilised both for a small quantity injection of fuel and also for a large quantity injection of fuel into the respective cylinder.

The invention can be utilised both with dual fuel engines and also with diesel internal combustion engines in which a fuel injector is utilised in order to inject different fuel quantities into a cylinder. Accordingly, a fuel injector can be utilised in a dual fuel engine in order to inject relatively much diesel fuel into the respective cylinder in a first operating mode, a so-called liquid fuel operating mode, but inject a relatively small fuel quantity into the cylinder in a second operating mode, in a so-called gas fuel operating mode, which then serves as ignition fluid for igniting a gas-air mixture. A fuel injector can also be utilised with a diesel internal combustion engine in order to inject different fuel quantities into the respective cylinder. Accordingly it is known from diesel internal combustion engines to introduce relatively much diesel fuel during a main injection and relatively little diesel fuel into the respective cylinder during a pre-injection and/or post-injection. The exact injection of the fuel is important in order to adhere to the emission regulations.

Figure 1:
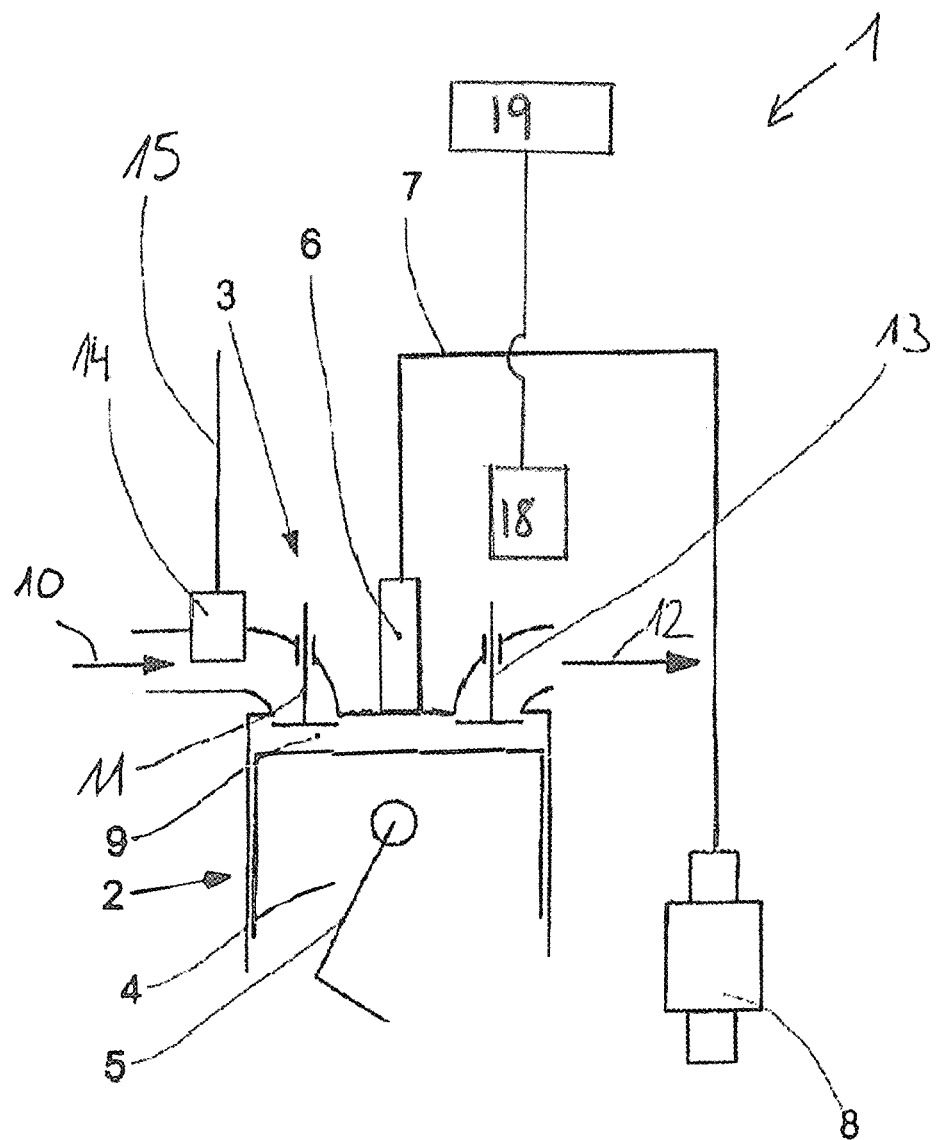
FIG. 1 is a schematic block diagram of a dual fuel engine.

Assemblies of a dual fuel engine 1 are exemplarily shown in FIG. 1. A cylinder 2 of such a dual fuel engine 1 comprises a cylinder head 3. In the cylinder 2, a piston 4, which is guided by a connecting rod 5, moves up and down.

In the cylinder head 3 a fuel injector 6 is attached, through which combustible fuel, in particular diesel fuel, can be injected into a combustion chamber 9 of the cylinder 2 via a fuel line 7 from a fuel pump 8. The fuel injector 6, the fuel line 7 and the fuel pump 8 are elements of a feed system. The diesel fuel can be for example heavy fuel oil.

Furthermore, for combusting the diesel fuel, charge air 10 can be introduced into the respective cylinder 2 of the dual fuel engine 1 via inlet valves 11, wherein exhaust gas 12 generated during the combustion of the fuel can be discharged from the respective cylinder 2 of the dual fuel engine 1 via exhaust valves 13.

In the combustion chamber 9 of the cylinder 2 of the dual fuel engine 1, a gas fuel can be alternatively combusted in a second operating mode, in a so-called gas operating mode. For this purpose, the dual fuel engine 1 comprises a gas fuel injector 14 via which gas fuel, which is provided by a gas supply line 15, is introduced into the combustion air 10, wherein the gas-air mixture is introduced into the combustion chamber 9 of the cylinder 2 via the inlet valve 11.

A combustible ignition fluid, which can be introduced into the combustion chamber 9 of the cylinder 2 with the help of the fuel injector 6 serves for igniting the gas-air mixture that is incombustible as such in the second operating mode of the dual fuel engine 1. Here, the diesel fuel serves as ignition fluid.

Accordingly, the fuel injector 6 can be utilised in the first operating mode and in the second operating mode of the dual fuel engine 1 and is suitable for injecting small fuel quantities.

As already explained above it is important to determine if, via the fuel injector 6, relatively much or relatively little fuel is injected into the respective cylinder 2. The invention following here now proposes a method and a control device with the help of which, in particular with the dual fuel engine 1 shown in FIG. 1, the operating state in which the fuel injector 6 is operated can be determined in order to establish whether small quantities or large quantities or medium quantities of fuel are injected via the same into the respective cylinder 2.

With the invention present here it is proposed, commencing with the activation of the respective fuel injector 6 for opening, i.e. commencing with the energization of the solenoid valve of the respective fuel injector 6, to detect by measurement structure-borne sound waves determined from the respective fuel injector over the time. For this purpose, the respective fuel injector 6 or the cylinder head 3 can be assigned a structure-borne sound wave sensor.

A structure-borne sound wave signal determined by measurement over the time is evaluated, namely in such a manner that dependent on the amount of at least one maximum of the structure-borne sound wave signals and/or dependent on the number of the maximums of the structure-borne sound wave signals and/or in the presence of multiple maximums dependent on the time sequence and/or the amount of the maximums, the operating mode of the respective fuel injector is deduced. These maximums are so-called local maximums of the respective structure-borne sound wave signals, which can also be referred to as signal peaks. According to one aspect of the invention, the structure-borne sound waves are measured by a sensor 18 and analyzed by an ECU 19 having a processor and memory.

Preferentially, the amount of the respective local maximum and the number of the local maximums as well as the time sequence of the local maximums combined are evaluated in order to deduce the operating mode of the respective fuel injector 6.

Figure 2:
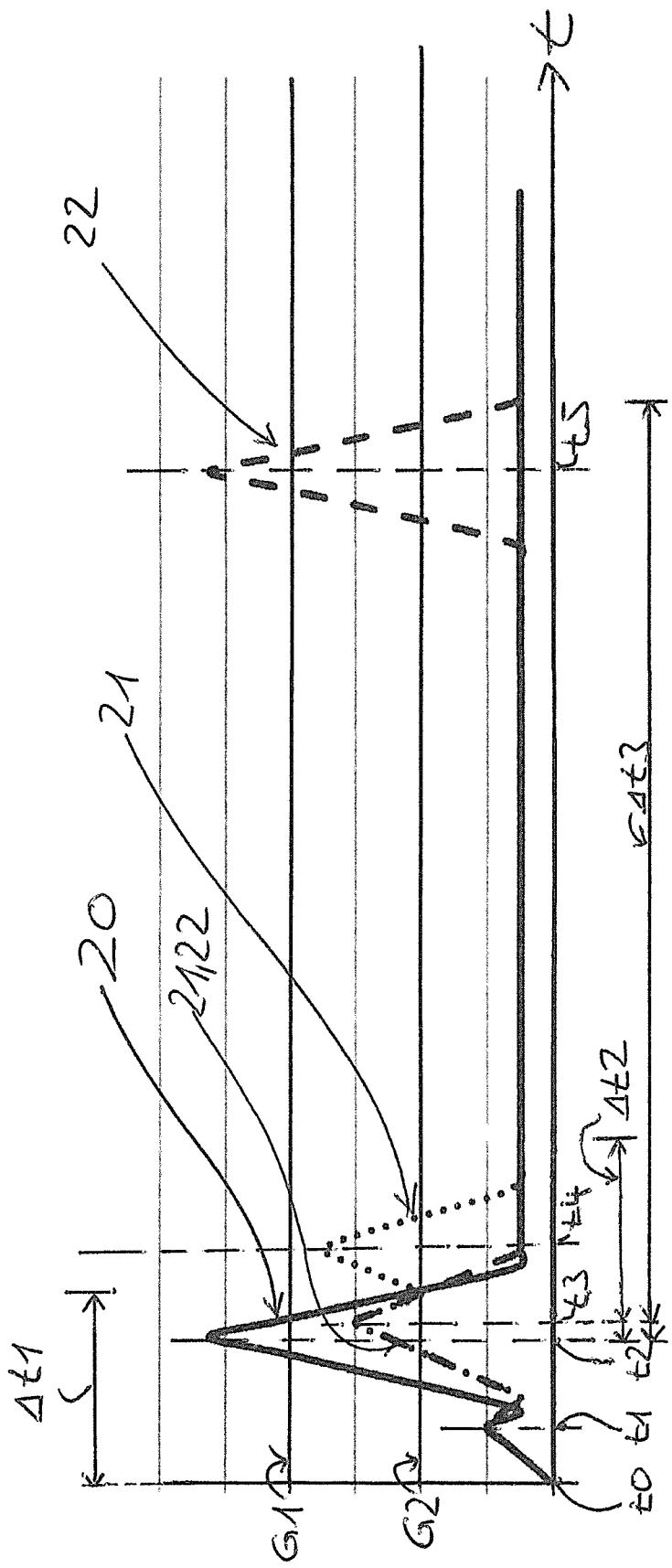
FIG. 2 is a time diagram illustrating the invention.

Further details of the invention are described in the following making reference to the time diagram of FIG. 2. In FIG. 2, signal profiles 20, 21 and 22 of different structure-borne sound wave signals detected by measurement are shown over the time t.

At the time t0 the activation of the solenoid valve or of the respective fuel injector 6 for opening takes place. Commencing at the time t0, a measurement signal is then detected namely a measurement signal regarding the structure-borne sound waves emitted by the respective fuel injector 6. The curve profiles 20, 21 and 22 show exemplary structure-borne sound wave signals detected by measurement.

The structure-borne sound wave signal corresponds to a state of the respective fuel injector 6 in which the same serves for injecting small quantities of fuel into a cylinder, in which thus an operating state of a small quantity injection is present on the fuel injector 6.

By contrast, the structure-borne sound wave signal 22 corresponds to an operating state of a large quantity injection of fuel into the respective cylinder, in which the respective fuel injector 6 thus injects much fuel into the respective cylinder.

The structure-borne sound wave signal 21 corresponds to a state of the respective fuel injector 6 in which a medium quantity injection of fuel is present, i.e. a quantity which is between a small quantity and a large quantity.

All curve profiles 20, 21 and 22 have in common that at the time t1 a maximum is detected which is caused by an opening strike of the solenoid valve of the respective fuel injector 6. This maximum at the time t1 is so low that the same is both smaller than a first limit value G1 and also smaller than a second limit value G2, so that this maximum is not considered further in the following.

The signal profile 20 of the small quantity injection is characterized in that within a defined time span $\Delta t1$, after the commencement of the activation of the respective fuel injector for opening, i.e. within a defined first period $\Delta t1$ after the time t0, a local maximum occurs in the structure-borne sound wave signal detected by measurement, here at the time t2, whose amount is greater than the first limit value G1. This maximum of the signal profile 20 is referred to as first maximum of the signal profile 20.

In particular when it is thus determined that within a defined first period $\Delta t1$ following the commencement of the activation of the fuel injector 6 for opening a first maximum occurs in the structure-borne sound wave signal detected by measurement, here in the structure-borne sound wave signal 20, occurs whose amount is greater than a first limit value G1, the first operating state of the respective fuel injector is deduced, namely an operating state of a small quantity injection of fuel in the respective cylinder.

In particular when within the defined first period $\Delta t1$ after the commencement of the activation of the respective fuel injector for opening, a local maximum occurs in the structure-borne sound wave signal detected by measurement, whose amount is smaller than the first limit value G1 but greater than the second limit value G2 (see signal profiles 21 and 22), either the second operating state or the third operating state of the respective fuel injector is deduced, i.e. either a large quantity fuel injector or a medium quantity fuel injector into the respective cylinder. This maximum of the signal profiles 21 and 22 is again referred to as first maximum.

Dependent on the further evaluation of the respective structure-borne sound wave signal, the second operating state or the third operating state is then deduced.

In particular when in the structure-borne sound wave signal detected by measurement the first maximum occurs within the defined first period $\Delta t1$, whose amount is smaller than the first limit value G1 and greater than the second limit value G2, but no further maximum occurs in the following, the second operating state of the respective fuel injector is deduced.

The second operating state of the respective fuel injector is likewise deduced in particular when, as shown for the signal profile 21 of FIG. 2, the first maximum occurs within the first defined period $\Delta t1$ (here at the time t3), whose amount is smaller than the first limit value G1 but greater than the second limit value G2 and following this within the first defined period $\Delta t1$ or according to FIG. 2 within a defined second period $\Delta t2$ following the occurrence of the first maximum (here at the time t4), a further or second maximum occurs whose amount is greater than the second limit value G2 and smaller than the first limit value G1.

Accordingly, when two local maximums are present in the structure-borne sound wave signal both of which are greater than the second limit value G and both of which are smaller than the first limit value G1, and the time interval between these two local maximums (here the time interval between the times t3 and t4) is relatively small or merely a single local maximum is present in the structure-borne sound wave signal whose amount is greater than the limit value G2 and smaller than the limit value G1, the second operating state of the respective fuel injector is accordingly deduced.

The second operating state of the respective fuel injector 6 is an operating state in which the same is utilised for the medium quantity injection in which a ballistic opening state of the nozzle needle of the respective fuel injector 6 is present.

In particular when in the structure-borne sound wave signal (see exemplary signal profile 22) the first maximum occurs within the defined first period $\Delta t1$ (here at the time t3) whose amount is smaller than the first limit value G1 and greater than the second limit value G2, and when in the following a further or second maximum occurs but not within the defined second period $\Delta t1$ and not within the defined second period $\Delta t2$, but within a longer, defined third period $\Delta t3$ (here at the time t5) following the occurrence of the first maximum, the third operating state of the respective fuel injector 6 is deduced, i.e. that for the nozzle needle a full stroke is present and accordingly the fuel injector 6 is utilised for the large quantity injection of fuel into the respective cylinder 2. Here, the second maximum of the signal profile 22, which occurs between the period $\Delta t3$, is greater than the first limit value G1 and greater than the second limit value G2.

In the signal profile 20, which can then be detected when the fuel injector 6 serves for a small quantity fuel injection, two maximums can accordingly be determined, namely a maximum at the time t1 and a maximum at the time t2. The maximum that occurs at the time t1 is filtered out since the same is both smaller than the limit value G1 and also smaller than the limit value G2. The maximum, which occurs at the time t2 and is greater than the limit value G1, occurs within the first period Δt1 and is referred to as first maximum, wherein no further maximum occurs in the following.

In the signal profile 21, which can be detected on the respective fuel injector 6 during a medium quantity injection, a maximum likewise occurs at the time t1 which is again filtered out. At the time t3, namely again within the period Δt1, a first maximum occurs that is greater than the limit value G2 but smaller than the limit value G1. Following this, a further maximum occurs in the signal profile 21 at the time t4 that is again greater than the limit value G2 but smaller than the limit value G1, wherein the time t4 in FIG. 2 is within the period Δt2. In this case, a medium quantity injection of fuel is then deduced.

In the signal profile 22, which can be detected in particular when a large quantity injection of fuel takes place, a maximum occurs again at the time t1, which is smaller than the two limit values G1 and G2, which is thus filtered out. At the time t3, the first maximum occurs again which in accordance with the curve profile 21 is greater than the limit value G2, but smaller than the limit value G1. The further maximum in the signal profile 22 only occurs at the time t5, i.e. outside the periods of time Δt1 and Δt2 but within the period Δt3, so that a large quantity injection is then deduced. This maximum is greater than the limit value G2 and greater than the limit value G1.

Through the evaluation of the structure-borne sound wave signal described above the operating state which is actually present on the respective fuel injector 6 can be easily and reliably determined. It can thus be also determined whether the fuel injector 6 is utilised for the small quantity injection, large quantity injection or medium quantity injection of fuel into the respective cylinder 2. By way of this, emission regulations or emission standards can be adhered to.

The invention, furthermore, relates to a control device for carrying out the method. The control device is equipped in order to carry out the method according to the invention on the control side. Accordingly, the control device 19 receives a measurement signal from the respective structure-borne sound wave sensor 18 via a data interface. The control device evaluates the measurement signal of the structure-borne sound wave sensor as described above in order to deduce the operating state of the respective fuel injector 6, in order to thus determine the operating state in which the same is operated, whether the same thus injects small quantities or large quantities or medium quantities of fuel into the cylinder.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for operating an internal combustion engine having multiple cylinders, wherein the internal combustion engine comprises at least one fuel injector for each cylinder, comprising:
    activating for opening and closing each fuel injector via a respective solenoid valve of each fuel injector;
    detecting by measurement over time structure-borne sound waves emitted by each fuel injector commencing with the activation of each respective fuel injector for opening;
    evaluating the detected structure-borne sound waves such that an operating mode of the respective fuel injector is deduced based at least in part on:
        an amount of at least one maximum of a structure-borne sound wave signal,
        and/or
        a number of maximums of the structure-borne sound wave signal and/or
        a presence of multiple maximums dependent on a time sequence and/or
        an amount a respective one maximum,
    wherein the operating mode is one of a diesel operating mode and a gas operating mode,
    wherein the activating for opening and closing each fuel injector is based at least in part on the operating mode.

2. The method according to claim 1, wherein a first operating state of the respective fuel injector is deduced when a first maximum occurs in the structure-borne sound wave signal detected by measurement, whose amount is greater than a first limit value (G1), within a defined first period (Δt1) following commencement of the activation of the respective fuel injector for opening.

3. The method according to claim 2, wherein the first operating state of the respective fuel injector is an operating state of a first quantity injection of fuel into the respective cylinder.

4. The method according to claim 2, wherein a second operating state or third operating state of the respective fuel injector is deduced when, within the defined first period (Δt1) following the commencement of the activation of the respective fuel injector for opening, the first maximum occurs in the structure-borne sound wave signal detected by measurement whose amount is smaller than the first limit value (G1) but greater than a second limit value (G2).

5. The method according to claim 4, wherein
    the second operating state is deduced when the first maximum occurs in the structure-borne sound wave signal within the defined first period (Δt1) whose amount is smaller than the first limit value (G1) but greater than the second limit value (G2), no further maximum occurs whose amount is greater than the second limit value (G2);
    the second operating state is deduced when the first maximum occurs in the structure-borne sound wave signal within the defined first period (Δt1) whose amount is smaller than the first limit value (G1) but greater than the second limit value (G2), and following within the defined first period (Δt1) or within a defined second period (Δt2) following the occurrence of the first maximum, a second maximum occurs whose amount is greater than the second limit value (G2); and the third operating state is deduced when the first maximum occurs in the structure-borne sound wave signal within the defined first period ($\Delta t1$) whose amount is smaller than the first limit value (G1) but greater than the second limit value (G2) and when following this a second maximum occurs however not within the defined first period ($\Delta t1$) or not within the defined second period ($\Delta t2$) but within a longer period ($\Delta t3$) after the occurrence of the first maximum.

6. The method according to claim 4, wherein the third operating state of the respective fuel injector is an operating state of a full stroke of a nozzle needle of the respective fuel injector.

7. The method according to claim 4, wherein the third operating state of the respective fuel injector is an operating state of a third quantity injection of fuel into the respective cylinder.

8. The method according to claim 4, wherein the second operating state of the respective fuel injector is an operating state of a ballistic opening state of a nozzle needle of the respective fuel injector.

9. The method according to claim 7 wherein the second operating state of the respective fuel injector is an operating state of a second quantity injection of fuel into the respective cylinder which is greater than a first quantity injection and smaller than the third quantity injection.

10. A control device for operating an internal combustion engine having multiple cylinders, wherein the internal combustion engine comprises at least one fuel injector for each cylinder, the control device configured to:
- activate for opening and closing each fuel injector via a respective solenoid valve of each fuel injector;
- detect by measurement over time structure-borne sound waves emitted by each fuel injector commencing with the activation of each respective fuel injector for opening;
- evaluate the detected structure-borne sound waves such that an operating mode of the respective fuel injector is deduced based at least in part on:

an amount of at least one maximum of a structure-borne sound wave signal, and/or
- a number of maximums of the structure-borne sound wave signal and/or
- a presence of multiple maximums dependent on a time sequence and/or
- an amount a respective one maximum,
- wherein the operating mode is one of a diesel operating mode and a gas operating mode, and
- wherein the activating for opening and closing each fuel injector is based at least in part on the operating mode.

* * * * *